United States Patent [19]

Takeda et al.

[11] 4,394,601
[45] Jul. 19, 1983

[54] ZNS:MN THIN-FILM ELECTROLUMINESCENT ELEMENT WITH MEMORY FUNCTION

[75] Inventors: Mikio Takeda, Tenri; Yoshinobu Kakihara, Nara; Masaru Yoshida; Yukihiko Nakata, both of Tenri, all of Japan

[73] Assignee: Sharp Kabushiki Kaisha, Osaka, Japan

[21] Appl. No.: 798,008

[22] Filed: May 18, 1977

Related U.S. Application Data

[63] Continuation of Ser. No. 486,096, Jul. 5, 1974, abandoned.

[51] Int. Cl.³ .................... H05B 33/14; H05B 33/18; H05B 33/22
[52] U.S. Cl. .................................................... 313/509
[58] Field of Search ............................... 313/506, 509

[56] References Cited

U.S. PATENT DOCUMENTS 2,933,602  4/1960  Gillson, Jr. ..................... 313/509 X
3,806,759  4/1974  Kabaservice et al. .......... 313/506 X
3,854,070  12/1974  Vlasenko et al. ............... 313/509 X

*Primary Examiner*—Palmer C. Demeo
*Attorney, Agent, or Firm*—Birch, Stewart, Kolasch & Birch

[57] ABSTRACT

A ZnS thin-film electroluminescent element which exhibits the hysteresis phenomenon within the light emission versus applied voltage characteristics, the electric current versus applied alternating voltage characteristics, or the electric current phase versus applied alternating voltage characteristics. The ZnS element comprises a ZnS EL thin-film including Mn serving as a luminescent center with a concentration of 0.05–5.0 wt. %, and a pair of dielectric layers made of rare earth oxides or oxides groups of III, IV and V of the Periodic Table. The EL thin-film is sandwiched between the pair of the dielectric layers. The ZnS EL thin-film is made by applying the electron-beam heating evaporation technology to a ZnS pellet.

3 Claims, 6 Drawing Figures

ZNS:MN THIN-FILM ELECTROLUMINESCENT ELEMENT WITH MEMORY FUNCTION

This application is a continuation of copending application Ser. No. 486,096, filed on July 5, 1974 now abandoned.

BACKGROUND OF THE INVENTION

The present invention relates to a novel ZnS thin-film electroluminescent element.

The electroluminescence phenomenon was discovered in the 1930's, and thereafter the engineering application and the peculiarities of the phenomenon have been studied by many research workers. The novel phenomenon discovered by the present inventors' studies shows that a kind of thin-film electroluminescent element, such as a ZnS thin-film EL element, of the type having a ZnS electroluminescent layer sandwiched between a pair of dielectric layers, i.e., the double insulating type structure, not only shows excellent electroluminescence but also exhibits a hysteresis phenomenon within, for example, the light emission versus applied voltage characteristics. It is possible to cause the above-described ZnS thin-film electroluminescent element to have the function of memorizing information by utilizing the hysteresis phenomenon. Therefore, the ZnS thin-film EL element becomes very useful, though a variety of applications of such EL element in the field of solid-state electronic technologies.

OBJECTS AND SUMMARY OF THE INVENTION

Accordingly, it is an object of the present invention to provide a ZnS thin-film electroluminescent element which exhibits the hysteresis phenomenon within the light emission versus applied voltage characteristics, the electric current versus applied alternating voltage characteristics, or the electric current phase versus applied alternating voltage characteristics.

The ZnS thin-film electroluminescent element of the double insulating structure type set forth above exhibits the above-mentioned hysteresis phenomenon when the structure and the formation method of the ZnS EL thin-film, as well as the material utilized as the pair of dielectric layers which hold the EL thin-film are desirably selected.

The ZnS thin-film electroluminescent element of the present invention comprises a ZnS thin-film electroluminescent layer including Mn, which serves as a luminescent center at a concentration of 0.05–5.0 wt. %, and a pair of dielectric layers made of rare earth oxides or oxides of groups of III, IV and V of the Periodic Table. The EL thin-film is fabricated by applying the electron-beam heating evaporation technology to a ZnS sintered pellet doped with Mn.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

It is well known that a thin-film electroluminescent element having a double insulating type structure comprising a ZnS thin-film electroluminescent layer sandwiched between a pair of dielectric layers shows excellent electroluminescence.

Figure 1:
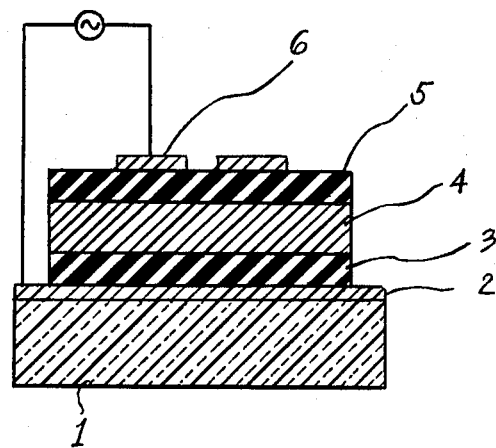
FIG. 1 is a sectional view of a ZnS:Mn thin-film electroluminescent element.

Referring now to FIG. 1, there is illustrated a typical ZnS thin-film EL element having a double insulating type structure, which comprises a glass substrate 1 coated with a transparent electrode made of, for example $SnO_2$ or $In_2O_3$, a ZnS thin-film electroluminescent layer 4 held by a pair of dielectric layers 3, 5 and a metal rear electrode 6 made of Al, etc. These layers 3, 4, 5, and electrodes 2, 6 are sequentially deposited on the substrate 1 in a tierlike formation by utilizing the evaporation technology. That is, the ZnS thin-film electroluminescent layer 4 is fabricated by evaporating a ZnS sintered pellet doped with Mn in a preferable quantity, the Mn serving as a luminescent center in the ZnS thin-film electroluminescent layer 4. The dielectric layers 3, 5 are made of either oxides or nitrides of semiconductors or metal elements, or compounds of these materials.

Figure 2:
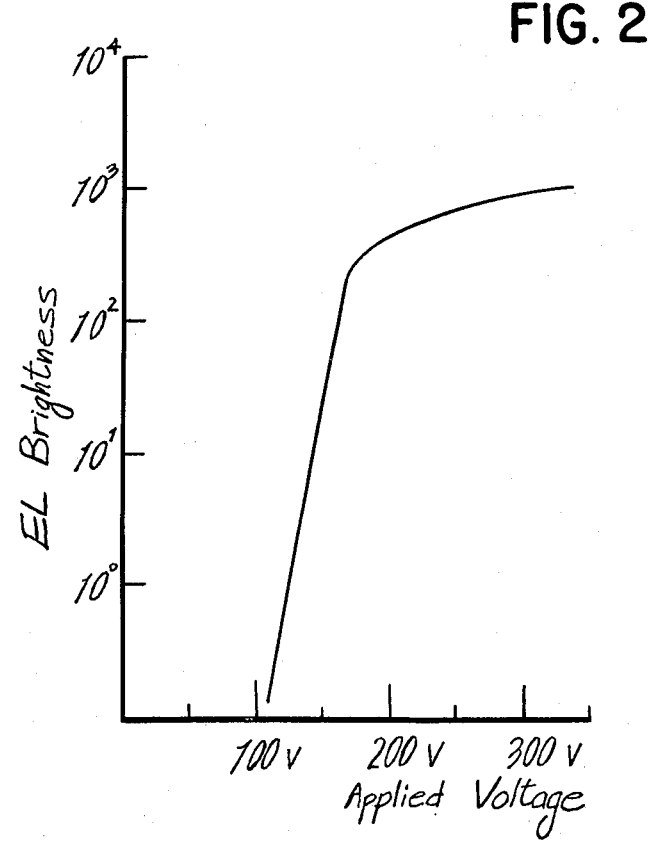
FIG. 2 is a graph showing the light emission versus applied voltage characteristics of the element of FIG. 1.

The electroluminescent element set forth above exhibits the light emission versus applied voltage characteristics as shown in FIG. 2 when an alternating voltage is applied across the electrodes 2, 6. It is necessary to cause the thin-film electroluminescent element to have an appropriate non-linear behavior for the purpose of electrically or optically realizing writing, erasing and reading operations.

The ZnS thin-film electroluminescent element may exhibit the non-linear behavior or the hysteresis phenomenon within the light emission versus applied voltage characteristics, the electric current versus applied alternating voltage characteristics, or the lectric current phase versus applied alternating voltage characteristics when the structure, formation method or material of the EL layer and the dielectric layers are properly selected. Thus, the EL element may exhibit the hysteresis phenomenon by utilizing transport effects of charge carriers captured at traps of a deep energy level formed in the ZnS thin-film electroluminescent layer or at the boundary areas between the ZnS EL layer and the dielectric layers. Nevertheless, in the past there has not been an effective method for forming traps in the EL layer or at the boundary areas between the EL layer and the dielectric layers. Therefore, the ZnS EL element of the prior art could not exhibit the above-mentioned hysteresis phenomenon.

The inventors have discovered that the ZnS thin-film EL element of the type set forth above exhibits hysteresis phenomenon when Mn is included within the ZnS thin-film electroluminescent layer at a concentration of 0.05–5.0 wt. % and the pair of dielectric layers are made of rare earth oxides or oxides selected from groups III, IV and V. Moreover, the hysteresis phenomenon increases when the ZnS thin-film electroluminescent element is fabricated under certain condition, i.e., by applying the electron-beam heating evaporation technology to a ZnS sintered pellet doped with a desired amount of Mn.

Figure 3A:
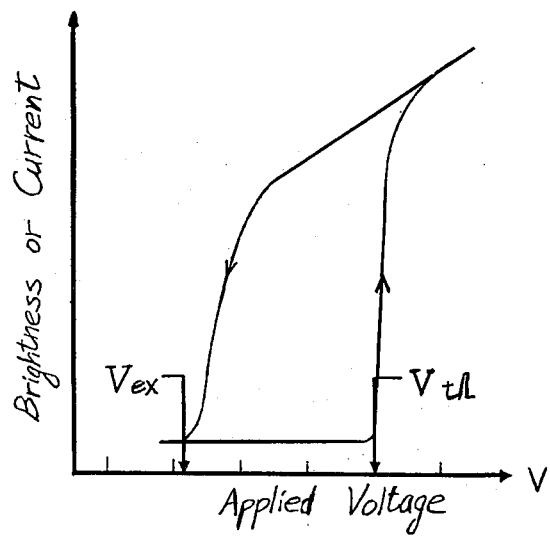
FIG. 3(A) is a graph showing hysteresis properties included within the light emission or electric current versus applied alternating voltage characteristics of an element of the present invention.
Figure 3B:
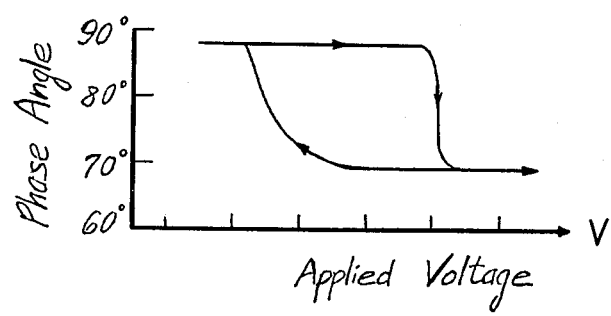
FIG. 3(B) is a graph showing hysteresis properties included within the electric current phase versus applied alternating voltage characteristics of the element of the present invention.

FIGS. 3(A) and 3(B) are graphs showing the hysteresis properties of the ZnS:Mn thin-film electroluminescent element of the present invention. FIG. 3(A) shows the hysteresis properties included within the light emission or electric current versus applied alternating voltage, and FIG. 3(B) shows the hysteresis properties included within the electric current phase versus applied alternating voltage characteristics.

The Mn must be doped into the ZnS crystal lattices at a proper concentration effective to serve as an active material for the luminescent center in the ZnS thin-film EL layer, and the ZnS polycrystalline grains in the ZnS thin-film must be grown to a proper size such as 0.05–0.2$\mu$ diameter, thereby causing the ZnS thin-film electroluminescent element to exhibit excellent electroluminescence and to have the trap of deep energy level within the layer. The inventors have discovered that the proper concentration of Mn is 0.05–5.0 wt. %, and the size of ZnS polycrystalline grains may be controlled by changing the concentration of Mn in the ZnS pellet used for evaporation and the substrate temperature in the course of the electron-beam heating evaporation process.

At least one of the pair of dielectric layers is made of rare earth elements or oxides of transition elements which will make oxide deficits in the course of their growth in order to establish the trap of deep energy level between the ZnS:Mn thin-film and the dielectric layer. These transition elements are included within groups III, IV and V, and the proper oxides thereof include $Dy_2O_3$, $Y_2O_3$, $Ta_2O_5$, $SiO_2$, etc. The oxide deficits in the course of growing grains cause the element to exhibit electrical characteristics which differ from the fundamental characteristics of the bulk. The EL element which is fabricated to fulfill the above-described conditions can exhibit the hysteresis phenomenon. The following is the method for manufacturing the ZnS:Mn EL element of the present invention.

Figure 4:
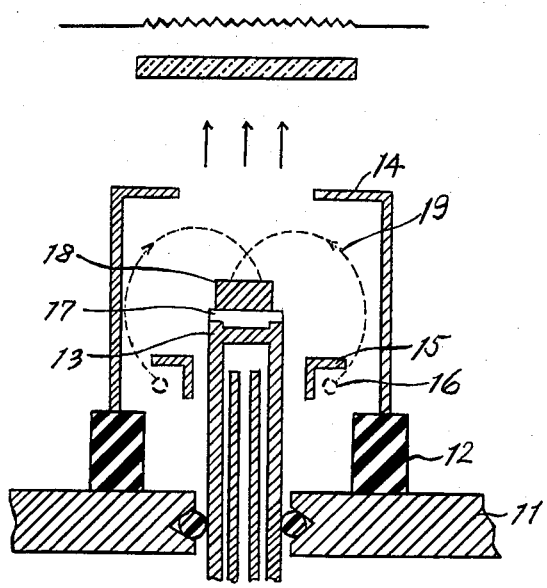
FIG. 4 is a sectional view of an electron-beam heating evaporation apparatus used for manufacturing the element of the present invention.

The ZnS:Mn electroluminescent thin-film is fabricated by utilizing the electron-beam heating evaporation technology, and a suitable furnace apparatus for realizing the technology is shown in FIG. 4. A base plate 11, an insulator 12, a water cooled anode 13 for supporting the pellet, an electron-beam deflector 14, a repeller 15, a tungsten filament 16, a Pt pedestal 17, a substrate 20 and a heater 21 for the substrate are provided. The ZnS sintered pellet 18 held on the Pt pedestal 17 receives electron beams 19 issued from the tungsten filament 16 and deflected by the deflector 14, thereby being heated and evaporated so that ZnS is diffused in a vapor phase. The ZnS is deposited on the substrate 20 by utilizing the electron-beam heating evaporation technique and the heater 21 maintains the substrate at a desired temperature.

In the preferred embodiment, the ZnS sintered pellet 18 is made by a procedure wherein high purity Mn is doped into the ZnS powder at the concentration of 0.05–5.0 wt. %, and thereafter the compound is pressed and held in pure argon gas at a temperature of 1100°–1200° C. The evaporation for fabricating the ZnS EL layer is carried out under the following conditions; the degree of vacuum, $0.2–1.0 \times 10^{-5}$ Torr.; the substrate temperature, 100°–300° C.; and the evaporation rate, 1800–2500 Å/minute. The substrate is held at 575°–600° C. in the vacuum for one or two hours after completion of the evaporation. The post heat treatment is carried out in order to cause Mn to dope sufficiently into the ZnS crystal lattices, and to relax the distortion of the ZnS EL layer. The formed ZnS:Mn EL layer has the film thickness of 0.4–2.0$\mu$ and contains Mn at the concentration of 0.05–5.0 wt. %.

Figure 5:
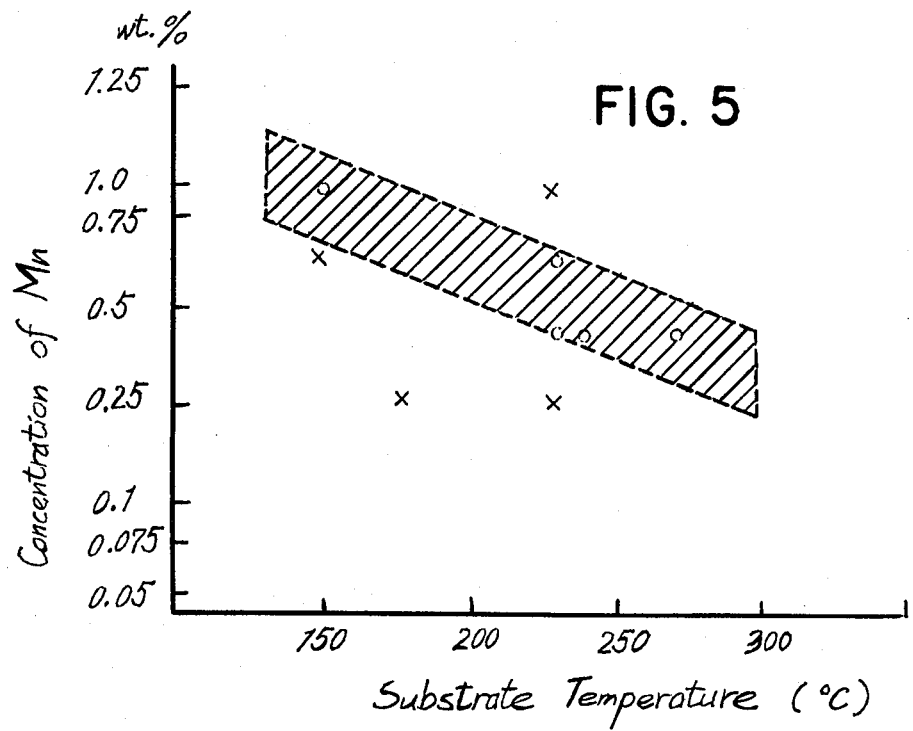
FIG. 5 is a graph explaining the relationship between the substrate temperature and the concentration of Mn included within a ZnS pellet.

FIG. 5 shows the relationship between the substrate temperature which is chosen in a range of 100°–300° C. and the concentration of Mn which is selected in a range from 0.05 to 5.0 wt. %, wherein the abscissas axis shows the substrate temperature in the evaporation operation and the ordinate axis shows the concentration of Mn in the pellet. The ZnS:Mn EL element including the EL layer fabricated under the conditions at the points designated as "O" in FIG. 5 exhibits the hysteresis phenomenon whereas the element including the EL layer fabricated under the condition at the points designated as "X" does not exhibit the hysteresis phenomenon. It may be understood from the graph that the element exhibits the hysteresis phenomenon when the ZnS:Mn EL thin-film thereof is made under the condition of electron-beam heating evaporation within the area shown by the oblique lines.

By the way, if the evaporation technique of resistive heating is employed for fabricating the EL thin-film instead of the electron-beam heating evaporation technology, the element can not obtain the proper characteristics since the concentration of Mn in the fabricated layer is not sufficient and is not uniform with respect to the distance in the direction of the thickness of the layer. The electron-beam heating evaporation techniques eliminates these defects.

The following is the method for manufacturing the dielectric layers of the present invention.

The dielectric layers made of rare earth oxides or oxides of groups III, IV and V may be fabricated by utilizing any one of the evaporation techniques, the sputtering technology, the anodic oxidation technology, or the chemical vapor deposition method.

In the preferred embodiment, the dielectric layers are fabricated by utilizing the electron-beam heating evaporation technology and the thickness of the layers is in the range of 0.2–0.5$\mu$.

The condition for fabricating the $Y_2O_3$ and $ZrO_2$ dielectric layers and the dielectric properties of the layers are tabulated as follows:

|  | $Y_2O_3$ | $ZrO_2$ |
|---|---|---|
| Shape of vapor source materials | compressed pellet | compressed pellet |
| Substrate temperature | 100~300° C. | 100~300° C. |
| Deposition rate | 400~500 Å/Min. | 400~500 Å/Min. |
| Residual Gas pressure | $0.5~1.0 \times 10^{-5}$ Torr. | $0.5~1.0 \times 10^{-5}$ Torr. |
| Dielectric constant at 1 KHz. | 10~12.5 | 19~22 |
| Loss tangent at 1 KHz. | $1~3 \times 10^{-3}$ | $2~4 \times 10^{-3}$ |
| Breakdown strength | $3~4 \times 10^6$ V/cm | $4 \times 10^6$ V/cm |

The ZnS:Mn thin-film electroluminescent element including the EL layer and the dielectric layers fabricated under the conditions as set forth above exhibits the hysteresis characteristics as shown in FIGS. 3(A) and 3(B) and thus may be used as a memory element.

Referring to FIG. 3(A), it is noted that a memory margin may be designated as Vth–Vex which is identical with the width of the hysteresis loop, where Vth is the threshold voltage level for EL emission on the voltage increasing curve, and Vex is the voltage level for extinguishing the light emission on the voltage decreasing curve. It is obvious that the element may increase the memory effects thereof as the memory margin increases.

The ZnS thin-film electroluminescent element including the ZnS thin-film electroluminescent layer fabricated under the condition within the area shown by the oblique lines of FIG. 5 and having dielectric layers made of $ZrO_2$ exhibits the following characteristics when a 1 KHz sinusoidal voltage is applied to the element; The width of the hysteresis loop is 15 V when the detection is carried out at a temperature of 300° K.; The width of the hysteresis loop is 30 V when the detection is carried out at a temperature 77° K. In the case where the dielectric layers are made of $Y_2O_3$, the characteristics of the element are as follows:

The width of the hysteresis loop is 15 V when the detection is carried out at a temperature of 300° K.; and The width of the hysteresis loop is 40 V when the detection is carried out at a temperature of 77° K.

The dielectric layers which sandwich the EL layer therebetween may be made of oxides of rare earth elements or oxides of groups III, IV and V, such as $Y_2O_3+SiO_2$, $ZrO_2+SiO_2$, etc.

The invention being thus described, it will be obvious that the same may be varied in many ways. Such variations are not to be regarded as a departure from the spirit and scope of the invention, and all such modifications are intended to be included within the scope of the following claims.

We claim:

1. A ZnS:Mn thin-film electroluminescent element containing a hysteresis memory function which comprises a ZnS:Mn thin-film electroluminescent layer containing ZnS polycrystalline grains having a diameter of 0.05 to $0.2\mu$ and containing Mn in a concentration of 0.05 to 5.0 weight percent, said Mn serving as a luminescent center, said electroluminescent layer being sandwiched between a pair of dielectric layers, at least one of the dielectric layers being made of $Y_2O_3$, and first and second electrodes provided on the respective dielectric layers, said ZnS:Mn electroluminescent layer having a thickness of $0.4-2.0\mu$ and a dielectric constant at 1 KHz of about 10 to 22, a loss tangent at 1 KHz of about 1 to $4\times10^3$, and a breakdown strength of about 3 to $4\times10^6$ V/cm.

2. A ZnS:Mn thin-film electroluminescent element containing a hysteresis memory function which comprises a ZnS:Mn thin-film electroluminescent layer containing ZnS polycrystalline grains having a diameter of 0.05 to $0.2\mu$ and containing Mn in a concentration of 0.05 to 5.0 weight percent, said Mn serving as a luminescent center, said electroluminescent layer being sandwiched between a pair of dielectric layers, at least one of the dielectric layers being made of $ZrO_2$, and first and second electrodes provided on the respective dielectric layers, said ZnS:Mn electroluminescent layer having a thickness of $0.4-2.0\mu$ and a dielectric constant at 1 KHz of about 10 to 22, a loss tangent at 1 KHz of about 1 to $4\times10^3$, and a breakdown strength of about 3 to $4\times10^6$ V/cm.

3. A ZnS:MN thin-film electroluminescent element containing a hysteresis memory function which comprises a ZnS:Mn thin-film electroluminescent layer containing ZnS polycrystalline grains having a diameter of 0.05 to $0.2\mu$ and containing Mn in a concentration of 0.05 to 5.0 weight percent, said Mn serving as a luminescent center, said electroluminescent layer being sandwiched between a pair of dielectric layers, at least one of the dielectric layers being made of $Dy_2O_3$, and first and second electrodes provided on the respective dielectric layers, said ZnS:Mn electroluminescent layer having a thickness of $0.4-2.0\mu$ and a dielectric constant at 1 KHz of about 10 to 22, a loss tangent at 1 KHz of about 1 to $4\times10^3$, and a breakdown strength of about 3 to $4\times10^6$ V/cm.

* * * * *

UNITED STATES PATENT AND TRADEMARK OFFICE
CERTIFICATE OF CORRECTION

PATENT NO. : 4,394,601
DATED : July 19, 1983
INVENTOR(S) : TAKEDA et al

It is certified that error appears in the above-identified patent and that said Letters Patent are hereby corrected as shown below:

In the Heading of the Patent, after the category "Related U.S. Application Data", insert --[30] Foreign Application Priority Data Jul. 5, 1973 [JP] Japan.................48-77329

Jul. 5, 1973 [JP] Japan.................48-77330--.

Signed and Sealed this

Twentieth Day of November 1984

[SEAL]

Attest:

GERALD J. MOSSINGHOFF

Attesting Officer          Commissioner of Patents and Trademarks